C. R. MABEE.
PROCESS OF TREATING LIQUID SUBSTANCES TO CHANGE THE CONDITION THEREOF BY EVAPORATION.
APPLICATION FILED DEC. 23, 1912.
1,420,643.
Patented June 27, 1922.
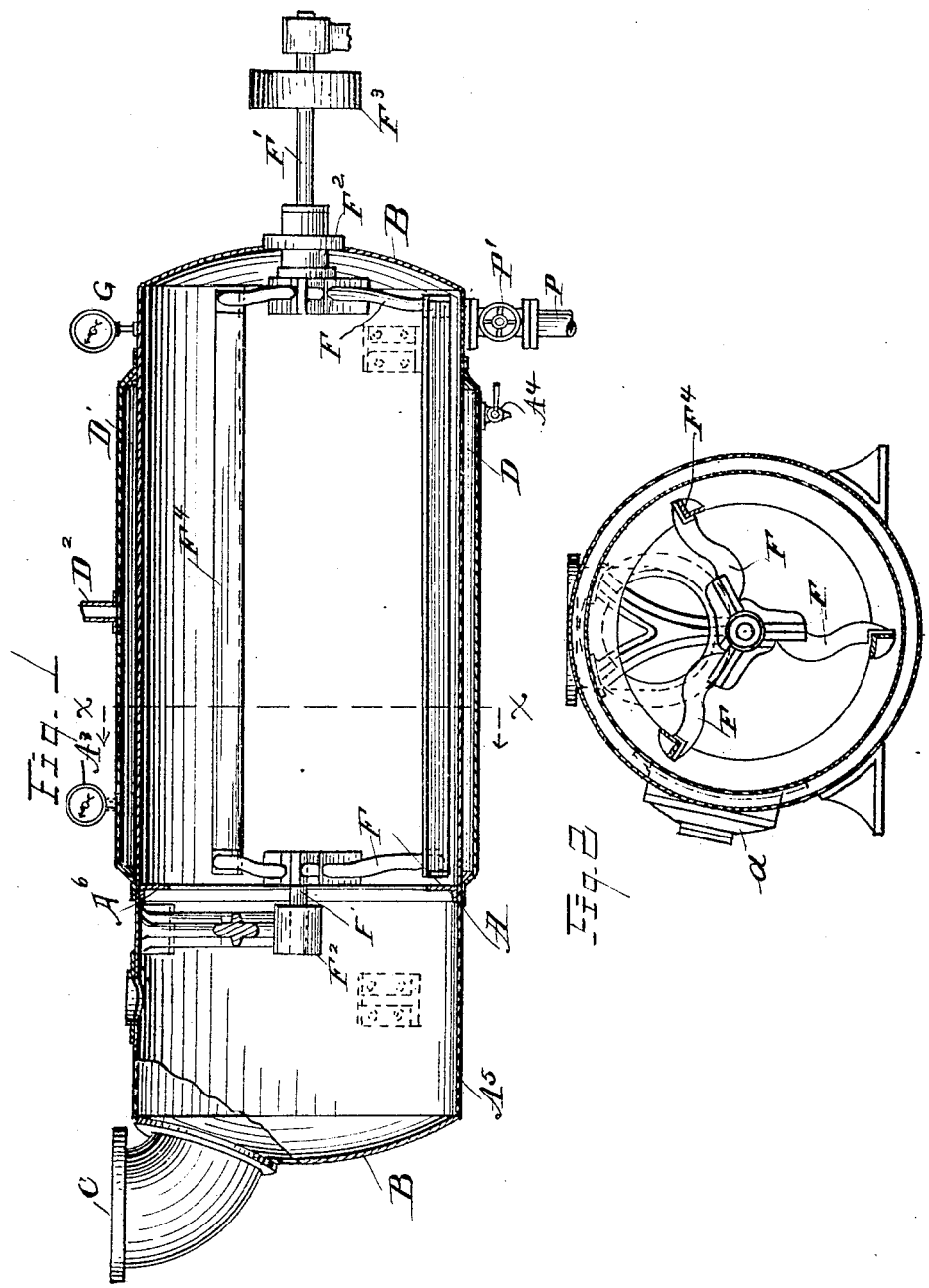
Witnesses
OBridel
E. M. Tuite.
Inventor
Charles R. Mabee
by Wm R Monro
Attorney

UNITED STATES PATENT OFFICE.

CHARLES R. MABEE, OF CLEVELAND, OHIO.

PROCESS OF TREATING LIQUID SUBSTANCES TO CHANGE THE CONDITION THEREOF BY EVAPORATION.

1,420,643. Specification of Letters Patent. Patented June 27, 1922.

Application filed December 23, 1912. Serial No. 738,178.

*To all whom it may concern:*

Be it known that I, CHARLES R. MABEE a citizen of the United States, and resident of Cleveland, in the county of Cuyahoga and State of Ohio, have invented certain new and useful Improvements in Processes of Treating Liquid Substances to Change the Condition Thereof by Evaporation, of which I hereby declare the following to be a full, clear, and exact description, such as will enable others skilled in the art to which it appertains to make and use the same.

This invention relates to the process for separating and evaporating the volatile portion from liquid containing any solid substance that is either dissolved therein or contained in suspension therein.

Certain physical laws are herein involved. It is to avoid the detrimental effects of some natural forces, and to utilize the beneficial effects of others, that this process is carried out.

The chief obstacle to evaporation is the surface pressure exerted by the atmosphere, not merely downward but in every direction, and which amounts to 14.7 pounds of pressure on each square inch of area, or which equals 2116 pounds per square foot of area of liquid, and which therefore retards the tendency of gaseous products to rise therein and escape therefrom.

As a result of the atmospheric pressure exerted upon the surface of liquid the number of heat units required to raise a given weight of liquid a given number of degrees in temperature varies with the physical conditions surrounding the operation, and the number of heat units required for evaporation is affected by molecular attraction, not only the attraction of one particle of the liquid to another particle of the liquid, but of the liquid to the surface of the vessel in which it is contained.

In the manufacture of salt by the grainer system, a depth of 18 inches of brine is an utter failure commercially, while a depth of 8 inches of brine is a commercial success.

It is also known that the molecular attraction exerted between solids and liquids in motion is not as great as the molecular attraction exerted between solids and liquids which are not in motion, as regards their individual position to one another, and also, that the molecular attraction exerted between liquids and gases in motion is not as great as the molecular attraction between gases and liquids which are not in motion, as regards their individual position to one another.

It has been demonstrated by this improved process that three-fourths of the weight of a given amount of liquid may be removed in the form of gas by passing the liquid in a thin layer rapidly over the heating surfaces for 28 minutes. Without this rapid motion the time required would be at least 75 minutes to reduce the weight the same amount.

The rapid passage of the layer over the heating surfaces in this process takes advantage of these laws regarding molecular attraction between solids and liquids and liquids and gases.

It is known that the condensation from steam under a given pressure in a steam jacket surrounded by liquid at a given temperature, which is not subjected to agitation, amounts to approximately two pounds per hour, per square foot of heating surface, in salt brine at 180° F., and it has been found that by this improved process the condensation from steam under a given temperature in a steam jacket surrounded by a liquid at a given temperature, and which is actively agitated, amounts to a number of pounds per square foot of heating surface which bears an accurate relation to the velocity with which the liquid operated upon passes over the heating surfaces, and which, in cases of active agitation has exceeded 70 pounds per hour per square foot of heating surface.

The heating surfaces in this process of separation and evaporation are made more efficient through the use of this physical law.

It is also known that objects passing through a body of liquid usually carry adjacent to its surfaces, an amount of air which bears a given relation to the nature of the surface.

It is also known that the passage of every object through a body of liquid creates an area of reduced pressure, adjacent to its surfaces, and that the degree of the reduction of the pressure is in direct proportion to the rapidity with which the object moves.

The arms which are used in this process of separation and evaporation to create and maintain the centrifugal and circumferential motion enable the process to benefit by these physical laws.

It is known that when a film of liquid passes rapidly over a heated surface that vapor is immediately created and carried along with the liquid between the liquid and the heated suface, and that the volume of vapor thus carried along bears a direct relation to the temperature of the heated surface, the velocity with which the liquid moves, and the weight of the film of liquid.

In this process the motion is very rapid and the pressure is increased by means of the centrifugal and circumferential motion which is a great advantage from the standpoint of rapid operation.

It is known that when a liquid is operated upon by centrifugal motion the heavier portions gather at the outside, at the greatest distance from the center, while the lighter portions remain on the inside of the current and that centrifugal motion separates vapor from liquids very rapidly.

It is known in practice that the separation of gases from liquids by centrifugal motion is so rapid that when heat is applied upon the exterior surface of the tube as in this process of separation, great difficulty is experienced in maintaining the liquid operated upon, in a heated condition.

This difficulty arises from the constant changing position of one molecule to another, which effects a somewhat pervious condition of the liquid, from the results of the centrifugal and circumferential motions, and from the means employed to remove the vapor quickly after it is created and after it is separated from the liquid operated upon.

I have taken into consideration these and other physical laws and have employed various arrangements of mechanical means for carrying out the process and have devised a method of largely overcoming atmospheric pressure by the creation of areas of greatly reduced pressure such that can be used successfully for commercial purposes, both under and upon the surface of liquids.

In carrying out the process which involves this invention the main features consist in, conveying a continuous layer of liquid over heated surfaces (while subjected to reduced pressure) and, at the same time, separating the vapor of evaporation from the liquid operated upon by means of both centrifugal and circumferential motion imparted thereto, and, at the same time using the means by which the centrifugal and circumferential motion is imparted to the liquid to create areas of reduced pressure within the body of the liquid, as it moves in the form of the film, and, at the same time, causing the heating surfaces to perform more work than would otherwise be the case on account of the rapid separation of the vapor from the liquid, the cooling effects resulting therefrom, and also, from the reduction of molecular attraction and atmospheric pressure as described herein.

The moving arms employed in this process of separation perform the following functions. They provide centrifugal motion, circumferential motion, they create areas subject to reduced pressure about and behind the surfaces of the materials of which they are composed, the reduction of molecular attraction, and the reduction of atmospheric pressure.

If a vacuum is employed over the surface of a liquid and is what is commercially known as a single effect vacuum the amount of water evaporated is less than one pound for each pound of steam consumed. If a double effect vacuum is employed the amount evaporated increases, and this increase is still greater with a triple effect vacuum, but, with the process of separation mentioned herein I have found that highly satisfactory results can be secured more economically, and this I attribute to the use of improved methods for reducing air pressure, the separation of the vapor of evaporation from the body of the liquid operated upon by centrifugal and circumferential motion, and by improved method of applying heat and reducing molecular attraction.

In consequence of the viscosity of the liquid operated upon and in consequence of the rapid motion of the arms through the body of the liquid operated upon, the air or vapor following rapidly in the course of the arms is caused to undergo a reduction in pressure as a result of which the surrounding liquid gives up steam or vapor in the same manner as the liquid in what is known as a vacuum pan gives up steam or vapor where a reduction of pressure is produced by the use of a vacuum pump.

The amount of steam or vapor given up in the area subjected to reduced pressure under the surface of a liquid bears a given relation to the amount of steam or vapor given up in areas subjected to reduced pressure above the surface, and, the amount of steam given up by the liquid, in each case, bears a direct relation to the area subjected to exposure and to the degree of pressure reduction.

In this process the rapid current of air or vapor caused by the use of an exhaust fan or vacuum pump carries away the globules so formed in a direction substantially at right angles to the direction of gravity, before they fall back into the body of the liquid.

It is especially desirable that the vapor of evaporation be removed in a direction substantially at right angles to the attraction of gravity, or, if not at right angles as nearly so as may be possible, as my experiments have proven that the vapor condenses very rapidly and falls back into the body of the liquid to a considerable amount when attempt is made to remove it in direct opposition to the attraction of gravity as in the case of upright vacuum pans now in use.

In my experiments I have proven that the number of heat units required for evaporation where the vapor is removed at an angle to the attraction of gravity are far greater in number than when the vapor is removed at right angles.

In carrying out this process commercially it is essential that heat be transmitted to the body of the liquid with great rapidity, a result that can be obtained by the rapid passage of the liquid operated upon over the heating surfaces.

In what is commercially known as the vacuum system the total reduction of pressure on a given expanse of liquid is limited by costly operation, and by the failure of the system to economically employ all heat units transmitted to the liquid.

The apparatus employed to carry out this process under normal conditions of air pressure may be usefully employed in what is commercially termed as vacuum pans.

In the accompanying drawings a machine adapted to carry out successfully the various steps of the process or method is illustrated. Fig. 1 of the drawings is a longitudinal central section of the device, and Fig. 2 is a transverse section on line $x-x$ Fig. 1.

In these views A is a cylindrical tube or chamber provided with air tight heads or closures B, B which may be provided with doors $a$ for access to the interior of the machine. C is an exhaust tube communicating with the chamber A through which vapors and gases are drawn from the chamber.

The necessary devices for exhausting the vapor of evaporation are made of any suitable type and hence need not be illustrated, but are operatively connected with the exhaust pipe C.

A steam jacket D encloses substantially two-thirds of the length of the tube A providing an annular space D' into which steam is supplied through a pipe $D^2$. A pressure gauge $A^3$ is preferably arranged in the upper part of the steam chamber, and a valve-control drainage outlet $A^4$ in the lower portion thereof is connected to the lower part of the same.

The steam jacket is shown as placed nearer one end of the tube A than the other, leaving an unjacketed part $A^5$. The annular partition or wall $A^6$ assists in separating this part of the tube or cylinder from the part A. It serves to define the end of the layer or film which is being subjected to treatment, the other end part being similarly defined by the closed end of the cylinder. The exhaust pipe C communicates with the unjacketed part of the container and a door $a$ may be employed when introducing the material which is to be treated; or, if desired, the material may be introduced at the top in the manner shown in my co-pending application 718,114, filed August 31, 1912.

A vacuum gauge G is also shown attached to the other end of the tube A. A pipe P and valve P' are attached to the tube at the lower right end by means of which a liquid product such as milk is drawn off from the tube after treatment. F, F are spider arms spaced apart and secured to shafts F', F' supported in bearings $F^2$, $F^2$ at each end of the machine, and rotated at a uniform rate of speed by means of a pulley $F^3$ or other power operating means.

The outer ends of the spider arms are connected by means of suitable appliances for giving a centrifugal movement to the materials to be treated to throw them against the inner surface of the heated tube, and thereafter to give them a circumferential movement about the inner surface of the tube.

The appliances for moving the liquid are shown as blades $F^4$.

The appliances which produce centrifugal movement in the liquid correspond in length with the length of the annular steam jacket and coincide in location therewith and the liquid in the unenclosed portion $A^5$ of the tube is not lifted from the lower portion of the tube or agitated to any appreciable extent.

The blades $F^4$, $F^4$ may be angle bars, shaped so as to give an outward centrifugal force to the fluid in the tube and retain it in close contact with the interior surface of the tube and the rear surface of each blade is preferably so designed as to obtain as large an opening as possible in the fluid behind the blade as it revolves, and hence provide an additional area subjected to reduced pressure within the tube.

The manner in which the evaporation and drying of the material enclosed in the tube is obtained may be described as follows, and may be illustrated by the treatment of milk with which the tube is charged. A vacuum of preferably 26 inches is maintained in the tube which is that ordinarily employed in upright vacuum pans.

The blades are then rotated about 80 times per minute and lift and spread the milk in a layer around the heating surface of the tube. This layer absorbs the heat quickly from the jacket owing to the very large heating surface thereof, and the rapid passage of the layer of milk thereover.

The molecules of milk and water are subjected to centrifugal force obtained by the revolving blades and as the molecules change their location incessantly they are continuously subject to the reduced atmospheric pressure in the interior of the tube which draws the vapor of evaporation away as fast as the vapor is generated by the heat, reduction of pressure and motion within the tube.

The heavier liquid is separated by the centrifugal force from the gaseous portions and lies more closely in contact with the surface of the tube, and the gaseous portions are quickly removed through the interior of the tube.

A film of superheated gases will be generated between the fluid constituting the film of liquid and the surface of the tube and be expelled from time to time, greatly accelerating the evaporation of the water from the solution.

When bodies such as the blades pass rapidly through a liquid they carry with them an area of vapor and leave an open space behind them into which the partial vacuum enters and evaporation is greatly accelerated by this fact.

The space $A^5$ which is not enclosed by the steam jacket contains no revolving blades and hence the liquid is left comparatively quiet therein so that the vapors and gases can pass out of the exhaust opening without drawing foam or fine particles of liquid with them. The low partition $A^6$ prevents the action of the blades $A^4$ from affecting the quiet of the liquid in the space $A^5$.

The watery portion of the solution after the centrifugal and circumferential motions are maintained for a few minutes collects on the inner surface of the film where the action of the partial vacuum will have the greatest effect in evaporating and carrying it away, and this will be accomplished much more easily than if the vapor of evaporation were compelled to overcome the weight of the liquid before it could rise to the surface from the lower portion of an upright vacuum pan.

It has been ascertained by repeated tests that greater efficiency can be secured in the evaporation of fluids by removing the vapor of evaporation in a direction at right angles to the attraction of gravitation rather than in a direction in opposition to the attraction of gravitation which is the present method in use in vacuum systems.

When the vapor leaves the surface of a liquid in a vertical direction in the ordinary vacuum pans, where there is a depth of liquid of three or four feet and a considerable distance therefrom to the off take pipe, the upward motion is slow in the fluid and the upward movement against gravity after passing through the fluid is slow, and at low velocity and a portion of the vapor will condense into globules and fall back into the liquid, and it is necessary to re-separate and re-evaporate the same.

In this device the vapor generates from the film of liquid and is drawn axially and horizontally through the tube and practically at right angles to the attraction of gravity, and hence has far less resistance to overcome from the effects of gravitation, and hence the economy in the use of heat units is greatly promoted.

The speed of evaporation of fluid contained in a vacuum chamber is greatly promoted by the depression below atmospheric pressure, so that water will boil in a vacuum of 26 inches at a tempreature of 135°. The advantage of the phenomena in evaporating and drying milk or other delicate food stuffs is obvious, since the milk will not be chemically changed as would be the case if high temperature were employed.

In this separating device there is but little adhesion of the milk to the heating surface since the parts are in constant movement and the liquid operated upon is in the form of a layer which passes rapidly over the heating surfaces.

For this reason no cooked flavor or odor is imparted to the milk as in the employment of many systems now generally in use.

Certain subject matter herein shown and described but not claimed is made the basis of claims in other applications already pending, or divisional applications to be subsequently filed.

I have in other, co-pending, applications illustrated and described modified forms of evaporating or condensing apparatus, and modified methods of procedure when performing the work of evaporating or condensing.

In my applications Serial No. 718,114, filed August 31, 1912, and Serial No. 277,904, filed February 18, 1919, being a division of application 718,114, I have illustrated and described a mechanism and method of applying vacuum or reduction of pressure to the interior chamber or space within the film formed on the interior surface of a heated container, a large vapor escape being provided at the end of the film, and the film being caused to move under centrifugal force over the heated surface of a container so as to cause the rapid flow of vapor masses inward from the heated surface to a large open space within the film, the vapors being caused to rapidly escape through the relatively large passage at the end of the film.

In application No. 805,598, filed December 9, 1913, I showed and described a mechanism of this general class; and in application No. 797,087, filed October 24, 1913 (renewed as No. 108,956) I described and illustrated the method of procedure which can be followed in using the last said apparatus;

the subjects matter of the applications last specified including the forming of a film or layer on the interior surface of the treating cylinder or tube, causing said film or layer to rapidly revolve circularly and also move axially, free escape for the vapors directly to the open atmosphere being provided for in that construction.

In applications No. 40,757, filed July 19, 1915, and No. 77,996, filed February 12, 1916, respectively, I presented a modified mechanism also having film-forming devices of the class of those herein, adapted to produce a film or layer of the material on the heating cylinder and also to cause the movement of the said film or layer circularly and simultaneously longitudinally or axially, together with devices for cleaning and polishing the active surface of the container, and together also with devices to remove gases, air, vapors, etc. (from the central axial vapor zone surrounded by said film or layer), and project such gases and vapors through an exhaust duct rapidly by the use of suitable mechanism.

And I do not herein claim any of the subjects matter presented by the claims in any of the several said co-pending applications.

Having described the invention what I claim as new and desire to secure by Letters Patent is:

1. The process of evaporation which consists in introducing material to be treated into an unheated portion of a cylindrical container, the wall of which has a heated and an unheated portion, allowing the material to flow from the unheated to the heated portion, subjecting the liquid while in the heated portion of the container to rapid rotatable movement while in circular layer formation over the interior surface of said heated portion, allowing the treated material to escape from the heated portion, and permitting the vapors of evaporation to escape from the container.

2. The process of evaporation which consists in introducing into a horizontally disposed cylindrical container the material to be treated, the wall of the container being divided into an unheated and a heated portion, allowing the material to flow from the unheated to the heated portion, subjecting the material while in the heated portion of the container to rapid circumferential movement while in circular layer formation, maintaining a central quiet zone for the escape of vapors, and allowing said vapors to escape from the unheated end of the container.

3. The process of evaporation which consists in introducing material into the inactive portion of a cylindrical container having an inactive and active zone, allowing the material to flow from the inactive to the active zone, subjecting the material while in the active zone to circumferential movement while in circular layer formation, maintaining a central quiet zone within said layer, and allowing the vapors to escape in a direction at substantially right angles to the force of gravity.

4. The process of evaporation which consists in introducing the material into an inactive and unheated portion of a cylindrical container, allowing the material so introduced to flow into an active and heated portion of said container, causing the material as it flows into the active portion of the container to assume a circular layer formation, causing said layer of material to rapidly move circumferentially over the interior surface of the active heated portion of the container, and allowing the material to escape from the heated portion of the container.

5. The process of evaporation which consists in introducing material into an inactive and unheated portion of a horizontally disposed cylindrical container, allowing the material to flow from the unheated portion to the heated portion of said container, causing the material as it enters the heated portion of the container to assume a circular layer formation, imparting to said layer formation a rapid rotatable movement and maintaining a central quiet zone for the escape of vapors, and allowing the treated material to escape and said vapors to continuously escape from the container.

6. The method of condensing a fluid containing a vaporizing component which consists in heating a tubular container circular in cross section, introducing into said container an amount of the fluid sufficient to form on the heated wall thereof a relatively thin stratum which surrounds an open axial cylindrical chamber of relatively large diameter confining, axially, the end parts of the stratum, subjecting the said axial chamber to the action of a positive exhaust, forcing the liquid substance outward centrifugally toward the heated container wall to form such stratum, causing the centrifugal action of the liquid to force relatively large volumes of vapor through the stratum inward into the exhaust chamber, withdrawing the vapor volumes from the heating region through a relatively wide escape opening at the end of the heating region and of a cross area approximately equal to that of the axial chamber into an adjacent chamber and then to an exhaust duct, and withdrawing the condensed residue of fluid substance from the end of the container opposite to the end where the fluid is supplied.

7. The method of treating a substance containing a liquid to change its consistency, it consisting in introducing into a heated container of circular cross section a quantity of the substance sufficient to form on the heated wall thereof a stratum confining, axially, the end parts of the stratum surrounding an open axial chamber of relatively large diameter, forcing the substance outward centrifugally toward said wall to form such stratum, positively moving the stratum circularly over the surface of the container, causing the centrifugal action of the liquid to rapidly force relatively large volumes of vapor inward into said axial chamber, withdrawing said vapor volumes from the axial chamber on lines parallel to the axis through a relatively wide escape passage at one end of the layer and of cross area approximating the cross area of the said axial chamber.

In testimony whereof, I hereunto set my hand this 3rd day of December, 1912.

CHARLES R. MABEE.

In presence of—
  WM. M. MONROE,
  GEO. S. COLE.